United States Patent
Hogan et al.

(10) Patent No.: US 10,335,946 B2
(45) Date of Patent: Jul. 2, 2019

(54) COMPOSITIONAL IMPEDANCE PROGRAMMING FOR ROBOTS

(71) Applicant: Massachusetts Institute of Technology, Cambridge, MA (US)

(72) Inventors: Neville Hogan, Sudbury, MA (US); Lucille Hosford, Edmonds, WA (US)

(73) Assignee: Massachusetts Institute of Technology, Cambridge, MA (US)

(*) Notice: Subject to any disclaimer, the term of this patent is extended or adjusted under 35 U.S.C. 154(b) by 337 days.

(21) Appl. No.: 15/435,544

(22) Filed: Feb. 17, 2017

(65) Prior Publication Data

US 2018/0236659 A1    Aug. 23, 2018

(51) Int. Cl.
*B25J 9/16* (2006.01)

(52) U.S. Cl.
CPC .......... *B25J 9/1641* (2013.01); *B25J 9/1661* (2013.01); *G05B 2219/39201* (2013.01)

(58) Field of Classification Search
CPC .............. B25J 9/1661; B25J 9/1641; G05B 2219/39201
See application file for complete search history.

(56) References Cited

U.S. PATENT DOCUMENTS

| | | | | |
|---|---|---|---|---|
| 6,226,566 B1 * | 5/2001 | Funda | ............. | B25J 9/1648 700/245 |
| 7,688,016 B2 * | 3/2010 | Aghili | ............. | B25J 9/1605 318/568.11 |
| 8,170,718 B2 * | 5/2012 | Abdallah | ............. | B25J 9/1653 700/245 |

OTHER PUBLICATIONS

Craig et al., "A Systematic Method of Hybrid Position/Force Control of a Manipulator;" Proceedings of the IEEE Computer Society's Third International Computer Software and Applications Conference; Jan. 1979; pp. 446-451; 6 Pages.

Dietrich et al., "On Continuous Null Space Projections for Torque-Based, Hierarchical, Multi-Objective Manipulation;" Proceedings of the IEEE International Conference on Robotics and Automation (ICRA); May 14-18, 2012; pp. 2978-2985; 8 Pages.

Khatib, "A Unified Approach for Motion and Force Control of Robot Manipulators: The Operational Space Formulation;" IEEE Journal of Robotics and Automation, vol. RA-3, No. 1; Feb. 1987; pp. 43-53; 11 Pages.

Klein et al., "Review of Pseudoinverse Control for Use with Kinematically Redundant Manipulators;" IEEE Transactions on Systems, Man, and Cybernetics, vol. SMC-13, No. 3; Mar./Apr. 1983; pp. 245-250; 6 Pages.

Mason, "Compliance and Force Control for Computer Controlled Manipulators;" IEEE Transactions on Systems, Man, and Cybernetics, vol. SMC-11, No. 6; Jun. 1981; pp. 418-432; 15 Pages.

Rancourt et al., "Stability in Force-Production Tasks;" Journal of Motor Behavior, vol. 33, No. 2; Jun. 2001; pp. 193-204; 12 Pages.

(Continued)

*Primary Examiner* — Rachid Bendidi
(74) *Attorney, Agent, or Firm* — Daly, Crowley, Mofford & Durkee LLP (57) ABSTRACT

Described herein are concepts, techniques, and structures for robot control using compositional impedance programming. In one embodiment, a robot control system comprises a plurality of impedance modules, each of the impedance modules defining one or more mechanical impedance parameters and an impedance controller.

14 Claims, 7 Drawing Sheets

(56) References Cited

OTHER PUBLICATIONS

Schindlbeck et al., "Unified Passivity-Based Cartesian Force/Impedance Control for Rigid and Flexible Joint Robots via Task-Energy Tanks;" IEEE International Conference on Robotics and Automation (ICRA); May 26-30, 2015; pp. 440-447; 8 Pages.

Schneider et al., "Object Impedance Control for Cooperative Manipulation: Theory and Experimental Results;" IEEE Transactions on Robotics and Automation, vol. 8, No. 3; Jan. 1989; 8 Pages.

Van De Vegte et al., "Teleoperator Control Models: Effects of Time Delay and Imperfect System Knowledge;" IEEE Transactions on Systems, Man, and Cybernetics, vol. 20, No. 6; Nov./Dec. 1990; pp. 1258-1272; 15 Pages.

Whitney, "Resolved Motion Rate Control of Manipulators and Human Prostheses;" IEEE Transactions on Man-Machine Systems, vol. MMS-10, No. 2; Jun. 1969; 7 Pages.

Denavit et al., "A Kinematic Notation for Lower-Pair Mechanisms Based on Matrices;" Trans. of the ASME; Journal of Applied Mechanics, vol. 22; Jan. 1955; pp. 215-221; 7 Pages.

Dietrich et al., "An Overview of Null Space Projections for Redundant, Torque-Controlled Robots;" Article from the International Journal of Robotics Research, vol. 34, No. 11; Jan. 2015; 16 Pages.

Hogan, "Impedance Control: An Approach to Manipulation: Part I—Theory;" Journal of Dynamic Systems, Measurement and Control, vol. 107, No. 1; Mar. 1985; 24 Pages.

Khatib, "Inertial Properties in Robotic Manipulation: An Object-Level Framework;" The International Journal of Robotics Research, vol. 14, No. 1; Feb. 1995; 37 Pages.

Muhammad, "Impedance Control of Redundant Manipulators;" Thesis; Tampereen Teknillinen Yliopisto—Tampere University of Technology; Publication 986; Nov. 4, 2011; 171 Pages.

Mussa-Ivaldi et al., "Integrable Solutions of Kinematic Redundancy Via Impedance Control;" International Journal of Robotics Research; Aug. 1988; 21 Pages.

Pratt et al., "Series Elastic Actuators;" Proceedings of International Conference on Intelligent Robots and Systems; Jan. 1995; pp. 399 to 406; 8 Pages.

Welch, "Navigation and Manipulation for Autonomous Underwater Dismantling of Offshore Structures;" Unpublished Doctoral Dissertation, Massachusetts Institute of Technology and Woods Hole Oceanographic Institution; Sep. 2015; 99 Pages.

\* cited by examiner

COMPOSITIONAL IMPEDANCE PROGRAMMING FOR ROBOTS

GOVERNMENT RIGHTS

This invention was made with government support under Grant No. CMMI-1548501 awarded by the National Science Foundation. The government has certain rights in the invention.

BACKGROUND

As is known in the art, the market for robotics is projected to grow rapidly. One factor that may influence increased penetration of robots is the scale-up of robot programming complexity. To improve dexterity and versatility, robots may be given increased degrees of freedom. The challenge of programming increases exponentially with the number of degrees of freedom. Cooperation among multiple end-effectors, arms, and/or multiple robots may increase robot capability, but at the cost of increased programming complexity.

Another factor that may influence increased penetration of robots is human-robot compatibility, for example the ability of robots to share workspace safely with humans. Robots that can be replaced seamlessly by human workers enable robust production lines, reducing sensitivity to robot failure. Physical human-robot collaboration may take advantage of the talents of both, e.g. robot precision combined with human adaptability.

As is also known in the art, impedance control is an approach to the control of dynamic interaction between a mechanism and its environment. Impedance control regulates the relationship between force and motion of the mechanism. An impedance controller may impose a spring-mass-damper behavior on the mechanism by maintaining a dynamic relationship between force and position, velocity and acceleration.

SUMMARY

Described herein are concepts, techniques, and related structures generally referred to as "compositional impedance programming." In general, compositional impedance programming allows a robotics programmer to supply a set of impedance behaviors that independently work to accomplish their goals, but together allow a robot to accomplish larger tasks.

Compositional impedance programming can be used to facilitate human-robot compatibility. A distinctive feature of human motor control is that humans routinely manipulate an environment with body parts other than hands and fingers. For example, humans may use a forearm, elbow, shoulder, hip and so forth to nudge or push on objects. Moreover, humans commonly use multiple body-parts simultaneously; e.g., humans may push a door open with an elbow or a shoulder while simultaneously carrying an object in one or both hands. Compositional impedance programming facilitates implementing such behaviors in robots.

Moreover, compositional impedance programming can reduce robot programming complexity. Conventional robot programming typically requires solving an "inverse kinematic" problem. That is, given a desired end-effector (e.g., hand or finger) position and orientation in its workspace, it may be necessary to compute a corresponding configuration of several robot joints. However, robots are becoming increasingly kinematically redundant in the sense that the same end-effector (e.g., robot "hand") position and orientation may be achieved with different configurations of the robot joints. The availability of multiple solutions can substantially complicate already-difficult inverse kinematic problems. There is a need for robot programming that does not require solving relatively complex engineering problems.

It is appreciated herein that it is possible to re-cast robot programming and control problems so that complex behaviors are decomposed into a plurality of impedance control laws referred to herein as "impedance modules." Each impedance module is assigned an appropriate mechanical impendence control law and corresponding parameters according to the theory of impedance control. Advantageously, recasting the robot programming problem as selecting appropriate mechanical impedances in one or more impedance modules can avoid the "inverse kinematic" problem. Moreover, the range of impedances can be selected to resemble a range of human impedances in comparable situations. Further, impedance modules can be re-combined and re-used across different programming problems.

According to one aspect of the disclosure, an impedance module may assign a relation between a robot end-effector force and a desired motion. This relationship can be modeled as a damped mechanical spring between its actual and desired position and can be mapped to a robot control law for the robot's actuated joints without inverting the robot kinematic equations.

Kinematic redundancy may be handled in the same or a similar manner. Robot joints may be assigned an impedance module that establishes a relation between their force and motion analogous to a damped mechanical spring. Acting together, these "virtual" springs define a unique configuration of the robot joints corresponding to each position and orientation of its end-effector.

According to various embodiments, impedance modules may be defined for robot "body parts" other than hands and fingers, such as use of forearm, elbow, shoulder, hip and so forth to nudge or push on objects. Moreover, the concepts, techniques, and structures described herein can be used to control multiple body-parts simultaneously, e.g. pushing a door open with the elbow or shoulder while simultaneously carrying an object in one or both hands, provided the robot has sufficient kinematic redundancy, that is, a sufficient number of degrees of freedom so that each of these body parts may be controlled without conflicting with one another.

It is appreciated herein that a key advantage of the above approach is that all component mechanical impedances (whether linear or nonlinear) superimpose their effects on the robot mechanism ("principle of superposition"). As a result, the end-effector and joint springs interact to make the end-effector converge towards the desired position and orientation while the joints converge to a compatible minimum-energy configuration—all without explicit inverse kinematic computation. The combined action of multiple impedances, whether linear or nonlinear, can be obtained by summing the forces they generate. Thus one impedance—a "base" or "reference" joint stiffness—can be specified to manage the redundant degrees of freedom while other impedances implement the desired interactive behavior.

According to some aspects of the disclosure, compositional impedance programming can be applied to closed-chain kinematics, e.g., when two or more robot arms interact with each other, either directly or through a grasped object. Closing a kinematic chain introduces one or more algebraic constraints on the kinematic equations of each arm, rendering them implicit. Previously, using inverse kinematic computation, this would require a relatively complex, iterative numerical solution. Such a computational challenge can be avoided by assigning each arm a separate impedance module as outlined above. Mechanically connecting the arms at their end-effectors causes each to converge to a common position and orientation—again without explicit inverse kinematic computation.

According to certain aspects of the disclosure, impedance modules can further simplify robot programming by eliminating the need to switch between control modes upon contact. Many production tasks involve combinations of unrestrained motion, contact with constraining surfaces, and control of the forces exerted on those surfaces. Humans tend to excel at such tasks, transitioning effortlessly between the different regimes (constrained and unconstrained). The concepts, techniques, and structures described herein can be used to impose robot impedances comparable to those of a human to achieve human-like competence in these tasks, thereby eliminating the need to switch between control modes upon contact.

According to one aspect of the disclosure, a robot control system comprises a plurality of impedance modules, each of the impedance modules defining one or more mechanical impedance parameters, and an impedance controller. The impedance controller may be configured to generate a composite robot control law based on the impedance modules, receive an actual robot configuration and an actual robot configuration-space velocity, generate an actuator torque using the composite robot control law, an actual configuration of a robot and an actual configuration-space velocity of the robot, and control actuators of the robot according the actuator torque.

In some embodiments, a first one of the impedance modules defines an impedance control law for an end-effector of the robot and wherein a second one of the impedance modules drives the robot to a selected base configuration. In certain embodiments, a third one of the impedance modules defines an impedance control law for an elbow of the robot.

In various embodiments, the impedance controller is further configured to transform the impedance control law for the end-effector from Cartesian-space to robot configuration-space. In some embodiments, the impedance controller is configured to take into account external forces when generating the actuator torque. In particular embodiments, one or more of the impedance modules are energetically passive.

In certain embodiments, a first one of the impedance modules defines a control law for a first robot and a second of the impedance modules defines a control law for a second robot different from the first robot. In some embodiments, at least one of the impedance modules defines one or more impedance parameters for a damped spring.

According to another aspect of the disclosure, a method for controlling a robot includes: selecting impedance parameters for each of a plurality of impedance modules, wherein each of the plurality of impedance modules specifies a robot behavior associated with a task, wherein each of the impedance modules and its selected impedance parameters define an impedance control law; transforming one or more of the impedance module control laws into configuration space; generating a composite control law using the impedance module controls laws in configuration-space; and controlling the robot using the composite control law.

In some embodiments, at least one of the impedance modules defines a damped spring control law to manipulate an object using an end-effector of the robot. In certain embodiments, at least one of the impedance modules defines a damped spring control law to manipulate an object using an elbow of the robot. In particular embodiments, at least one of the impedance modules imposes a base joint stiffness on the robot.

In various embodiments, selecting impedance parameters for each of a plurality of impedance modules includes selecting, for at least one of the impedance modules, a resting position, a stiffness, and a damping coefficient for a damped spring control law. In certain embodiments, selecting impedance parameters for each of a plurality of impedance modules includes selecting, for at least one of the impedance modules, a base joint stiffness for the robot. In some embodiments, selecting the base joint stiffness for the robot includes selecting a base joint stiffness to reduce apparent end-effector mass normal to an object's surface.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some concepts and terminology are explained.

The behavior and dynamics of a robot may be described in several related geometric spaces. The behavior of a robot end-effector and its relation to external locations and objects is best described in external coordinates of "world space." This is usually defined by Cartesian coordinates with respect to a well-defined reference frame such as the base of the robot. Cartesian coordinates of an end-effector are often defined by six degrees of freedom: translations in three orthogonal directions and rotations about three orthogonal axes. Alternatively, the kinematics and dynamics of a robot mechanism are best described in joint coordinates or "configuration space." Configuration space is usually identified with generalized coordinates (as defined in classical mechanics): angles of revolute joints and translations of prismatic joints. Configuration space may have many more degrees of freedom than an end effector; in that case the robot is kinematically redundant with respect to that end-effector. The relation (or transformation) between configuration space and world space is fully defined by the kinematic equations of the robot, determined by the geometry and design of the machine.

As is known in the art, a robot which is stable during unrestrained motion may become unstable upon contact with or physical coupling to an object or a rigid surface. Most objects and rigid surfaces are "energetically passive." Energetically passive objects cannot continuously supply mechanical power in response to forces and motions imposed upon them. It has been shown that if a robot exhibits interactive behavior equivalent to that of an energetically passive object, physical contact with an unknown passive object cannot induce instability. Therefore, if mechanical impedance is constrained to be energetically passive, physical contact cannot induce instability.

Figure 1:
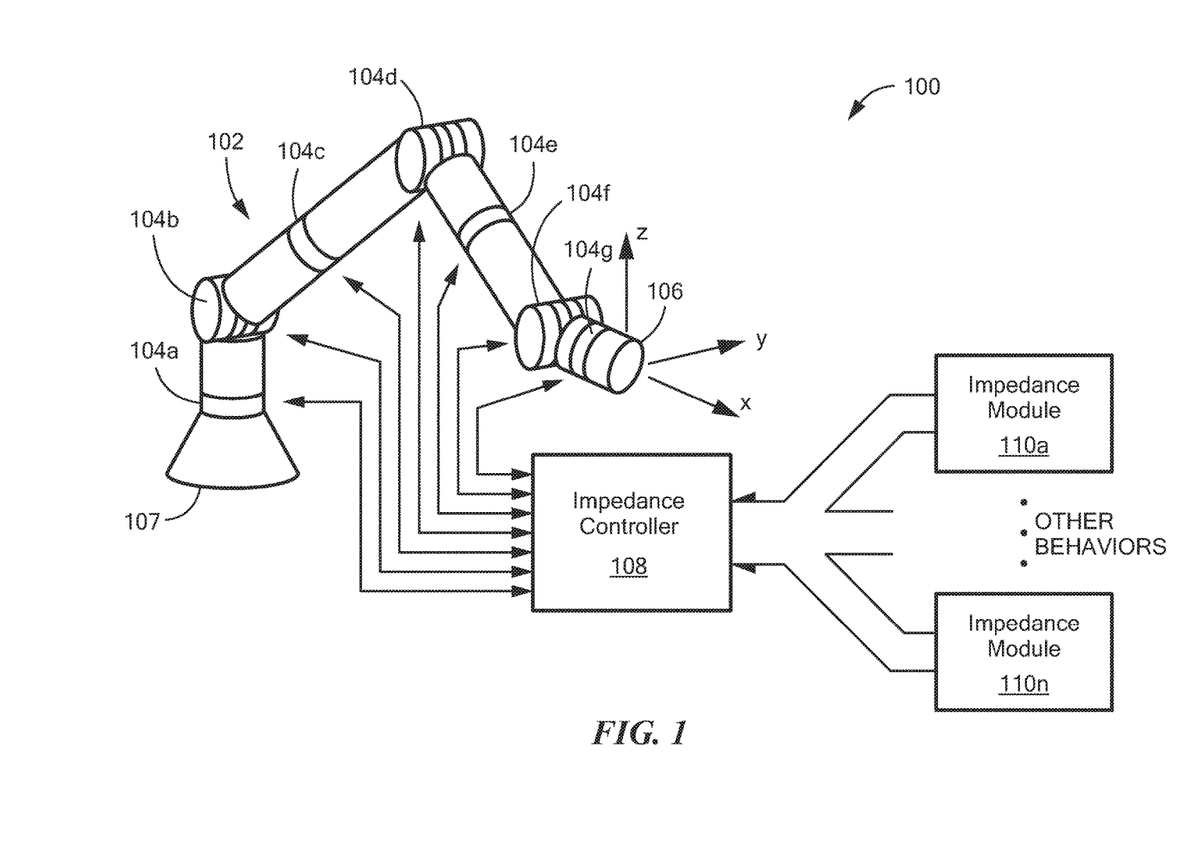
FIG. 1 is a schematic diagram illustrating an impedance controller for controlling a single-arm robot, according to some embodiments of the disclosure.

Referring to FIG. 1, compositional impedance programming is illustrated using a single-arm robot. In the embodiment shown, an illustrative system 100 includes a robot 102, an impedance controller 108, and a plurality of impedance modules 110a ... 110n (110 generally).

The robot 102 includes an end-effector 106 coupled to a trunk 107 via a series of joints 104a ... 104g (104 generally). The joints 104 provide multiple degrees of freedom (e.g., six degrees of freedom) to the end-effector 106 relative to the trunk 107. The robot joints 104 may be driven by force- or torque-controlled actuators. Non-limiting examples of actuators that may be used include series elastic actuators (SEAs), variable-impedance actuators, and current-controlled electric motors.

The controller 108 is configured to receive impedance control parameters from each of the impedance modules 110 and, based on a composition of the received impedance parameters, to generate and send force/torque control signals to the joint 104 actuators. The controller 108 also receives force/torque feedback information from the joint actuators.

In certain embodiments, one or more of the impedance modules 110 is energetically passive. It is appreciated that using robot impedance modules that are energetically passive substantially guarantees that the robot cannot be destabilized by physical contact with a human, thereby enhancing safety.

The concepts and techniques described above can be extended to an arbitrary number of impedance modules 110. A given impedance module 110 may control the movement of a given robot "body part" or the robot's configuration. As explained below, multiple impedance modules 110 can be readily combined—using the principle of superposition—to program complex robot behavior.

A general description of concepts and techniques that may be utilized within the impedance modules 110 and controller 108 are described next.

A robot's 102 configuration space may be defined by generalized coordinates $\theta$. The transformation of motion variables (position, velocity, etc.) from the robot's configuration space to any other point on the robot, e.g. its end-effector 106, is well-defined. The relation between an end-effector's position x and generalized coordinates can be determined by the kinematic equations $x=L(\theta)$. The relation between end-effector velocity $\dot{x}$ and generalized velocity $\dot{\theta}$ is $\dot{x}=J(\theta)\dot{\theta}$ where $J(\theta)$ is the configuration-dependent Jacobian matrix, which may be non-square, e.g. if the robot is kinematically redundant.

Conversely, the relation between a force or torque exerted at any point on the robot (e.g. end-effector 106) and generalized forces conjugate to generalized displacements (e.g. actuator torques) is also well-defined. The relation between end-effector force/torque f and actuator torque $\tau$ may be expressed as $\tau=J^T(\theta)f$.

Mechanical impedance is an operator that relates motion to force, $f(t)=Z\{x(t)\}$. The operator $Z\{\bullet\}$ may be linear, nonlinear, static, dynamic, etc., but is chosen to be well-defined. Advantageously, the mechanical impedance operator can be transformed to a corresponding configuration-space impedance $Z_{cs}\{\bullet\}=J^T(\bullet)Z\{L(\bullet)\}$, where $\tau(t)=Z_{cs}\{\theta(t)\}$ without inverting the kinematic equations.

For clarity, a simple example follows. The behavior of a "virtual" damped spring connected to a robot end-effector may be modeled as:

$$f_{ef}=k_{ef}(x_{ef0}-x_{ef})+b_{ef}(\dot{x}_{ef0}-\dot{x}_{ef})$$

in which:
  $f_{ef}$ denotes an end-effector force;
  $k_{ef}$ denotes a stiffness of the virtual spring;
  $x_{ef0}$ denotes a "rest" position of the virtual spring;
  $x_{ef}$ denotes a current position of the end-effector;
  $b_{ef}$ denotes a damping coefficient of the virtual spring;
  $\dot{x}_{ef}$ denotes a velocity at the current end-effector position;
  an overdot denotes a time derivative; and
  $\dot{x}_{ef0}$ denotes a velocity at the rest position of the virtual spring.

It will be understood that, if the so-called "virtual" damped spring were an actual damped spring connected to the end-effector, it would tend to drive an end effector towards the rest position $x_{ef0}$.

Transforming this behavior to configuration space identifies a nonlinear control law:

$$\tau_{ef}=J_{ef}^T(\theta)[k_{ef}(x_{ef0}-L_{ef}(\theta))+b_{ef}(\dot{x}_{ef0}-J_{ef}(\theta)\dot{\theta})]$$

in which:
  $\tau_{ef}$ denotes the torque generated by this controller;
  $\theta$ denotes the configuration variables of the robot;
  $\dot{\theta}$ denotes the robot's velocity in configuration space;
  $L_{ef}$ denotes the forward kinematic equations relating the robot configuration to end-effector position;
  $J_{ef}$ denotes the corresponding Jacobian matrix; and
  $J_{ef}^T$ denotes a transpose of Jacobian matrix $J_{ef}$.

This control law implements a "virtual" damped spring that drives the end effector towards the position $x_0$. It will be appreciated that the control law above does not require inversion the robot's kinematic equations. As a result this control law can function at and through the robot's kinematic singularities.

The aforementioned damped spring model $f_{ef}=k_{ef}(x_{ef0}-x_{ef})+b_{ef}(\dot{x}_{ef0}-\dot{x}_{ef})$ and its constituent impedance parameters may correspond to an impedance module 110 in FIG. 1. An impedance module 110 provides information to the impedance controller 108 that can be used to control the joint 104 actuators and, in turn, the position of the end-effector 106. The controller 108 can control end-effector 106 during free motion, during contact with objects, and/or during transitions between these two states.

It should be understood that the impedance module described above does not directly control the robot configuration (i.e., the orientation of the various joints 104). To drive the robot to a desired configuration $\theta_0$, a second impedance module 110 may be provided which defines a "virtual" configuration-space damped spring. The configuration-space damped spring may be described as:

$$\tau_c=K(\theta_0-\theta)-B(\dot{\theta})$$

in which:
  K denotes a stiffness of the joints; and
  B denotes a damping coefficient of the joints.

The two impedance modules 100 described above can be added together to define a non-linear control law:

$$\tau_{ef+c} = J_{ef}^T(\theta)[k_{ef}(x_{ef0} - L_{ef}(\theta)) + b_{ef}(\dot{x}_{ef0} - J_{ef}(\theta)\dot{\theta})] + K(\theta_0 - \theta) - B(\theta)$$

The resulting control law (referred to herein as a "composite control law") drives the end-effector 106 towards the position $x_0$ while the robot configuration tends towards the configuration $\theta_0$. The steady-state end-effector position and robot configuration compromise between the two dynamic attractors $x_0$ and $\theta_0$ to reduce (and ideally minimize) the amount of "energy" stored in the virtual springs defined by $k_{ef}$ and K. Such a combination of impedance modules can provide simultaneous control of robot's end-effector and redundant degrees of freedom.

The end-effector virtual spring stiffness $k_{ef}$ can be selected to dominate the configuration-space virtual spring stiffness $K_c$ in order to drive the robot configuration to be approximately compatible with $x_0$. This may be achieved if $$K_c >> J_{ef}^T(\theta) k_{ef} J_{ef}(\theta).$$

A similar approach may be applied at any other point on the robot 102. Thus, for example, using subscript e to denote the elbow, the impedance module $f_e = k_e(x_{e0} - x_e) + b_e(\dot{x}_{e0} - \dot{x}_e)$ may describe a "virtual" damped spring behavior connected to the elbow. Such a behavior may be implemented by a nonlinear configuration-space control law $\tau_e = J_e^T(\theta)[k_e(x_{e0} - L_e(\theta)) + b_e(\dot{x}_{e0} - J_e(\theta)\dot{\theta})]$. This impedance module can be combined with the impedance-based control laws described above. In particular, the end-effector virtual damped spring and the elbow virtual damped spring may be added together to define a nonlinear control law:

$$\tau_{ef+e} = J_{ef}^T(\theta)[k_{ef}(x_{ef0} - L_{ef}(\theta)) + b_{ef}(\dot{x}_{ef0} - J_{ef}(\theta)\dot{\theta})] + J_e^T(\theta)[k_e(x_{e0} - L_e(\theta)) + b_e(\dot{x}_{e0} - J_e(\theta)\dot{\theta})]$$

This composite control law drives the end-effector 106 towards the position $x_0$ while the elbow tends towards the position $x_{e0}$. If both positions are compatible with the robot's kinematics, both will be reached exactly in steady-state. If they are not, the steady-state robot configuration will be a compromise between the two dynamic attractors $x_0$ and $x_{e0}$ to reduce (and ideally minimize) the amount of "energy" stored in the virtual springs defined by $k_{ef}$ and $k_e$. It is appreciated that the combination of impedance modules provides a way to control the robot's end-effector 106 and redundant degrees of freedom simultaneously that is different from previous techniques.

Figure 1A:
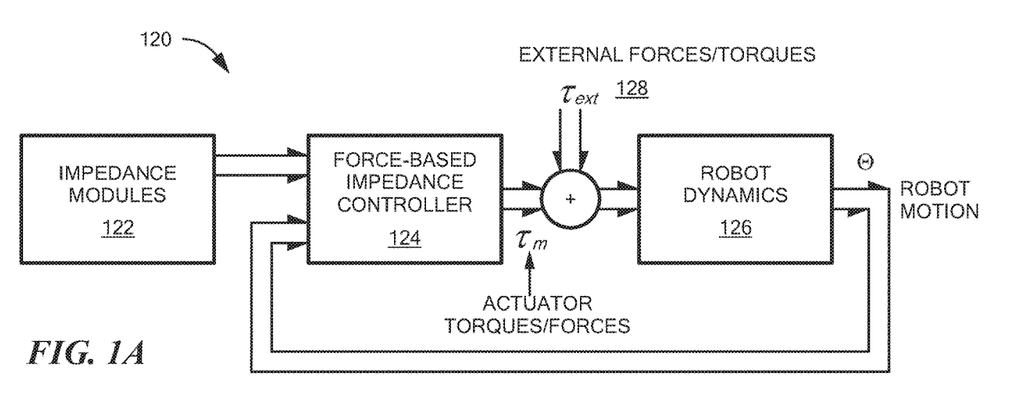
FIG. 1A is a block diagram showing a robot control system using compositional impedance programming, in conjunction with force-based impedance control.

Referring now to FIG. 1A, a robot control system 120 includes a plurality of impedance modules 122 and a force-based impedance controller 124 coupled to a set of robot dynamics 126. An impedance module 122 may be the same as or similar to an impedance module 110 shown in FIG. 1 and described above in conjunction therewith, as may the impedance controller 124 may be the same or similar to controller 108. The set of robot dynamics 126 may correspond to a set of force- or torque-controlled actuators (e.g., actuators for joints 104 in FIG. 1).

As described above in conjunction with FIG. 1, an impedance module 122 can be used to control the position of a robot "body part" and/or to drive the robot to a desired configuration. Such an impedance module 122 can define a mechanical impedance control law and corresponding parameters (e.g., the stiffness, damping coefficient, and resting position of a damped spring).

The forced-based impedance controller 124 receives the impedance control law parameters from the impedance modules 122 and generates a composite control law by summing (i.e., superimposing) the individual impedance module control laws. In the case where an impedance module 122 specifies an impedance control law in Cartesian-space, the impedance controller 124 may transfer the control law to configuration space using a Jacobian matrix associated with the end-effector.

The impedance controller 124 also receives actual robot configuration $\theta$ and velocity $\dot{\theta}$ information as feedback from the robot dynamics 126. The impedance controller 124 uses the composite control law along with the actual robot configuration $\theta$ and corresponding configuration-space velocity $\dot{\theta}$ to calculate a torque (denoted $\tau_m$ in FIG. 1A). The torque $\tau_m$ (referred to herein as the "actuator torque") represents the torque required to be applied by one or more actuators to the robot mechanism (i.e., robot dynamics 126) to achieve the desired behaviors specified by the impedance modules 122 (e.g., to move an end-effector to its desired position $x_{ef0}$ while driving the robot toward a desired configuration $\theta_0$).

The system 120 may also be influenced by external forces 128 (denoted as a torque $\tau_{ext}$) which are shown in FIG. 1A as being combined with the actuator torque $\tau_m$ and provided to the robot dynamics 126. Thus, the impedance controller may also take into account external forces 128 when determining the torque $\tau_m$ required to move the desired robot to the desired position/configuration. External forces may arise when motion of an object held by the robot end-effector is opposed by the inertia and friction of the object. The forces required to move the object exert reaction forces on the end-effector. Those "external" forces $f_{ext}$ in turn exert "external" torques $\tau_{ext}$ on the robot joints, where $\tau_{ext} = J_{ef}^T(\theta) f_{ext}$. External torques and actuator torques combine by simple addition to act on the robot mechanism.

It should be understood the impedance module impedance parameters, actuator torque $\tau_m$, external torque $\tau_{ext}$, actual robot configuration $\theta$, and/or actual configuration-space velocity $\dot{\theta}$ may be provided as vector quantities, as illustrated using double connector lines in FIG. 1A.

In various embodiments, the impedance controller 124 includes real-time control software configured to implement the composite control law.

Figure 1B:
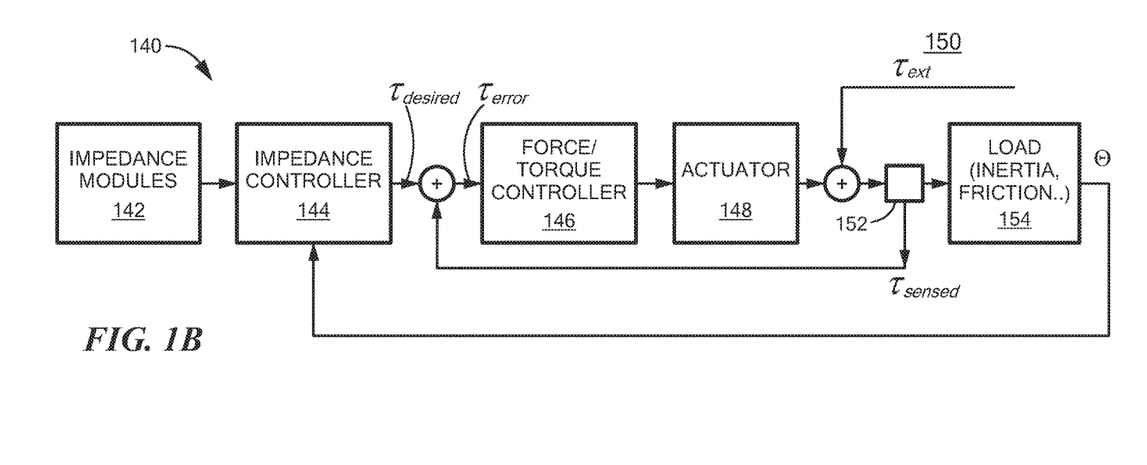
FIG. 1B is a more detailed block diagram of a robot control system using compositional impedance programming, in conjunction with force-based impedance control.

FIG. 1B is a more detailed diagram of a robot control system 140 using compositional impedance programming, according to some embodiments. The system 140 is shown as having a single degree of freedom (e.g., a single actuator), however the structures and concepts shown in the figure and described herein can be applied to an arbitrary number of degrees of freedom. The illustrative system 140 includes impedance modules 142, impedance controller 144, force/torque controller 146, and actuator 148.

The impedance controller 144 receives impedance parameters from impedance modules 142 and uses this information to derive a composite control law. The impedance controller 144 also receives the actual robot configuration $\theta$ and configuration-space velocity $\dot{\theta}$ and, using the composite control law, calculates a actuator torque $\tau_m$, which is provided to the force/torque controller 146. The force/torque controller 146 drives the actuator 148 according to the received actuator torque. The impedance controller 144 and/or force/torque controller 146 may take into account external forces 150 (denoted as torque $\tau_{ext}$ in the figure). The actual robot configuration $\theta$ and configuration-space velocity $\dot{\theta}$ result not only from the actuator torque and external forces (i.e., $\tau_m + \tau_{ext}$), but also the mechanical impedances acting on the system, such as inertia and friction, as illustrated by load 154.

The system 140 also includes a torque sensor 152 to determine the actual (or "sensed") torque $\tau_{sensed}$ exhibited $\tau_{sensed}$ by the actuator 148. The actual torque $\tau_{sensed}$ is summed with the impedance controller output (i.e., with desired torque $\tau_{desired}$), as shown. The actual torque $\tau_{sensed}$ is "signed" to generate a signal (denoted $\tau_{error}$) proportional to the error between the desired torque and actual/sensed torque. The force/torque controller 146 is configured to reduce (and, in some cases, to minimize or eliminate) the error $\tau_{error}$.

It will be understood that FIGS. 1A and 1B depict embodiments of a force-based impedance control system. In other embodiments, position-based impedance control may be used. A person skilled in the art will understand how to apply the compositional impedance programming concepts and techniques described to position-based impedance control systems.

Figure 2:
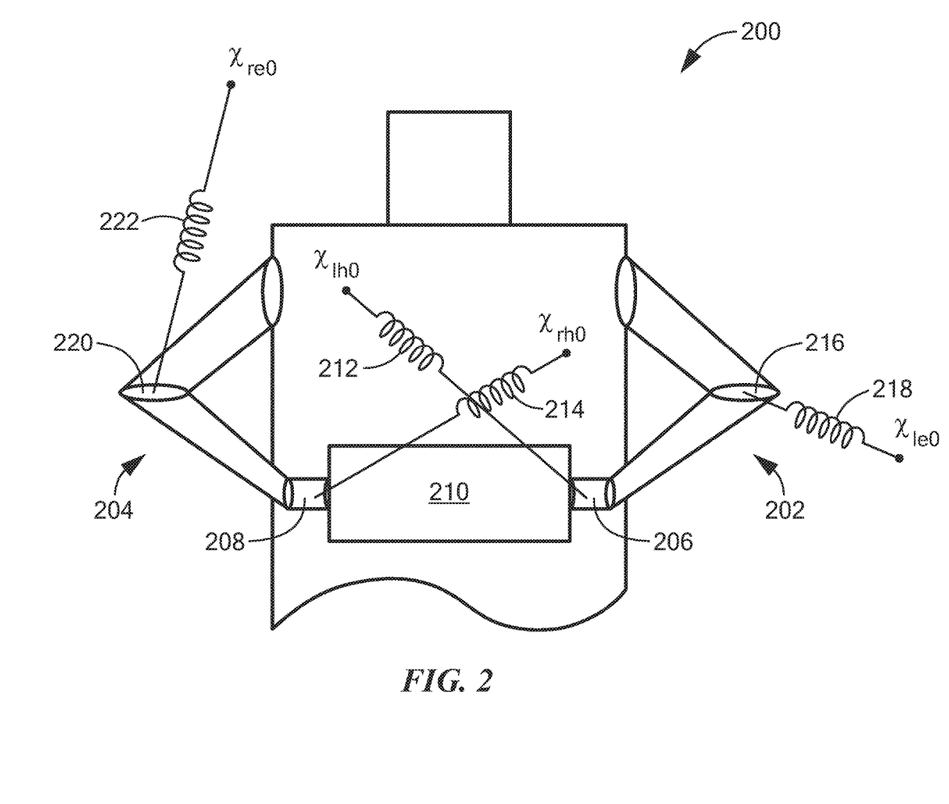
FIG. 2 is diagrammatic illustration of compositional impedance control applied to coordinate multiple robot arms to manipulate an object.

Referring to FIG. 2, compositional impedance programming may be extended to multiple robot end-effectors (e.g., multiple hands or finders) interacting physically with each other or via a commonly held object. As illustrated in FIG. 2, a robot 200 may include a left arm 202 having a first end-effector ("left hand") 206, and a right arm 204 having a second end-effector ("right hand") 208. Each of the arms 202, 204 may include a plurality of force- or torque-controlled actuators acting upon several degrees of freedom. A plurality of impedance modules may be defined for controlling the robot arms 202, 204 such that the end-effectors 206, 208 can collectively grasp, lift, move, or otherwise manipulate an object 210 to accomplish a given task.

As illustrated in FIG. 2, a first impedance module may be defined to drive the left hand 206 towards resting position $x_{lh0}$ using a first virtual damped spring 212, a second impedance module may be defined to drive the right hand 208 towards resting position $x_{rh0}$ using a second virtual damped spring 214, a third impedance module may be defined to drive the left elbow 216 towards resting position $x_{le0}$ using a third virtual damped spring 218, and a fourth impedance module may be defined to drive the right elbow 220 towards resting position $x_{re0}$ using a fourth virtual damped spring 222. The impedance modules may be the same as or similar to impedance modules 122 in FIG. 1A and/or impedance modules 142 in FIG. 1B. The impedance parameters for these impedance modules (e.g., spring stiffness, damping coefficient, and resting position) may be selected such that the robot can manipulate the object 210 according to a given task. In addition, a configuration-space virtual damped spring may be defined for each of the right and left arms to drive the arms to respective configurations $\theta_{r0}$ and $\theta_{l0}$ (to promote clarity in the drawings, the configuration space "springs" $\theta_{r0}$ and $\theta_{l0}$ are not shown in FIG. 2).

Using the concepts described above in conjunction with FIG. 1, a nonlinear control law for the robot 200 may be generated by summing the impedance module impedance control laws as follows:

$$\tau = J_{lh}^T(\theta_l)\left[k_{lh}(x_{lh0} - L_{lh}(\theta_l)) + b_{lh}(\dot{x}_{lh0} - J_{lh}(\theta_l)\dot{\theta}_l)\right] +$$
$$J_{le}^T(\theta_l)\left[k_{le}(x_{le0} - L_{le}(\theta_l)) + b_{le}(\dot{x}_{le0} - J_{le}(\theta_l)\dot{\theta}_l)\right] + K_l(\theta_{l0} - \theta_l) -$$
$$B_l(\dot{\theta}_l) + J_{rh}^T(\theta_r)\left[k_{rh}(x_{rh0} - L_{rh}(\theta_r)) + b_{rh}(\dot{x}_{rh0} - J_{rh}(\theta_r)\dot{\theta}_r)\right] +$$
$$J_{re}^T(\theta_r)\left[k_{re}(x_{re0} - L_{re}(\theta_r)) + b_{re}(\dot{x}_{re0} - J_{re}(\theta_r)\dot{\theta}_r)\right] + K_r(\theta_{l0} - \theta_r) - B_r(\dot{\theta}_r)$$

in which:

$\tau$ denotes the torque generated by the control law;

$x_{1h0}$, $b_{lh}$, and $k_{lh}$ denote the impedance parameters for the left hand virtual spring (i.e., virtual spring 212);

$x_{rh0}$, $b_{rh}$, and $k_{rh}$ denote the impedance parameters for the right hand virtual spring (i.e., virtual spring 214);

$x_{le0}$, $b_{le}$, and $k_{le}$ denote the impedance parameters for the left elbow virtual spring (i.e., virtual spring 218);

$x_{re0}$, $b_{re}$, and $k_{re}$ denote the impedance parameters for the right elbow virtual spring (i.e., virtual spring 222);

$\theta_{l0}$, $B_l$, and $K_l$ denote the impedance parameters for the left arm configuration behavior;

$\theta_{r0}$, $B_r$, and $K_r$ denote the impedance parameters for the right arm configuration behavior;

$\theta_l$ and $\theta_r$ denote the actual configuration of the left and right arms, respectively;

$\dot{\theta}_l$ and $\dot{\theta}_r$ denote the configuration-space velocity of the left and right arms, respectively;

$L_{lh}$ and $L_{rh}$ denote the forward kinematic equations for the left and right hands, respectively;

$J_{lh}$, $J_{rh}$, and $J_{re}$ denote the Jacobian matrices for the left hand, right hand, left elbow, and right elbow, respectively; and $J_{lh}^T$, $J_{rh}^T$, $J_{le}^T$, and $J_{re}^T$, denote the transposes of the Jacobian matrices for the left hand, right hand, left elbow, and right elbow, respectively.

It should be understood that the above composite control law can be used to drive the left and right end-effectors 206 and 208 towards respective positions $x_{lh0}$ and $x_{rh0}$ and the left and right elbows 216 and 220 towards respective positions $x_{le0}$ and $x_{re0}$, while simultaneously driving the left and right robots arms 202 and 204 to respective configurations $\theta_{l0}$ and $\theta_{r0}$. The positions $x_{lh0}$, $x_{rh0}$, $x_{le0}$, and $x_{re0}$ and configurations $\theta_{l0}$ and $\theta_{r0}$ may be selected using any suitable techniques, examples of which are described below in conjunction with FIGS. 3 and 3A. In various embodiments, the configurations $\theta_{l0}$ and $\theta_{r0}$ are selected to be approximately compatible with the positions $x_{lh0}$, $x_{rh0}$, $x_{le0}$, and/or $x_{re0}$.

It should be noted that the composite robot control law described above is composed of six impedance modules, each of which may be computed independently and in parallel. If needed or advantageous, the control law can further be decomposed into even simpler components. For example, it is sufficient for the configuration-space stiffness matrices $K_l$ and $K_r$ and the damping matrices $B_l$ and $B_r$ to be diagonal and positive-definite. In that case, a virtual damped spring may be assigned to each individual joint independently.

Similarly, knowledge of an object to be manipulated and/or a task to be performed may enable decomposition of an end-effector stiffness matrix (e.g., a 6×6 matrix). For example, to trace a poorly-known surface, the stiffness may be decomposed into six independent behaviors: in directions tangent to the nominal surface, stiffness should be high; in the normal direction (and in all rotational degrees of freedom) stiffness should be low. Such decomposition can reduce computation required for compositional impedance programming.

Figure 3:
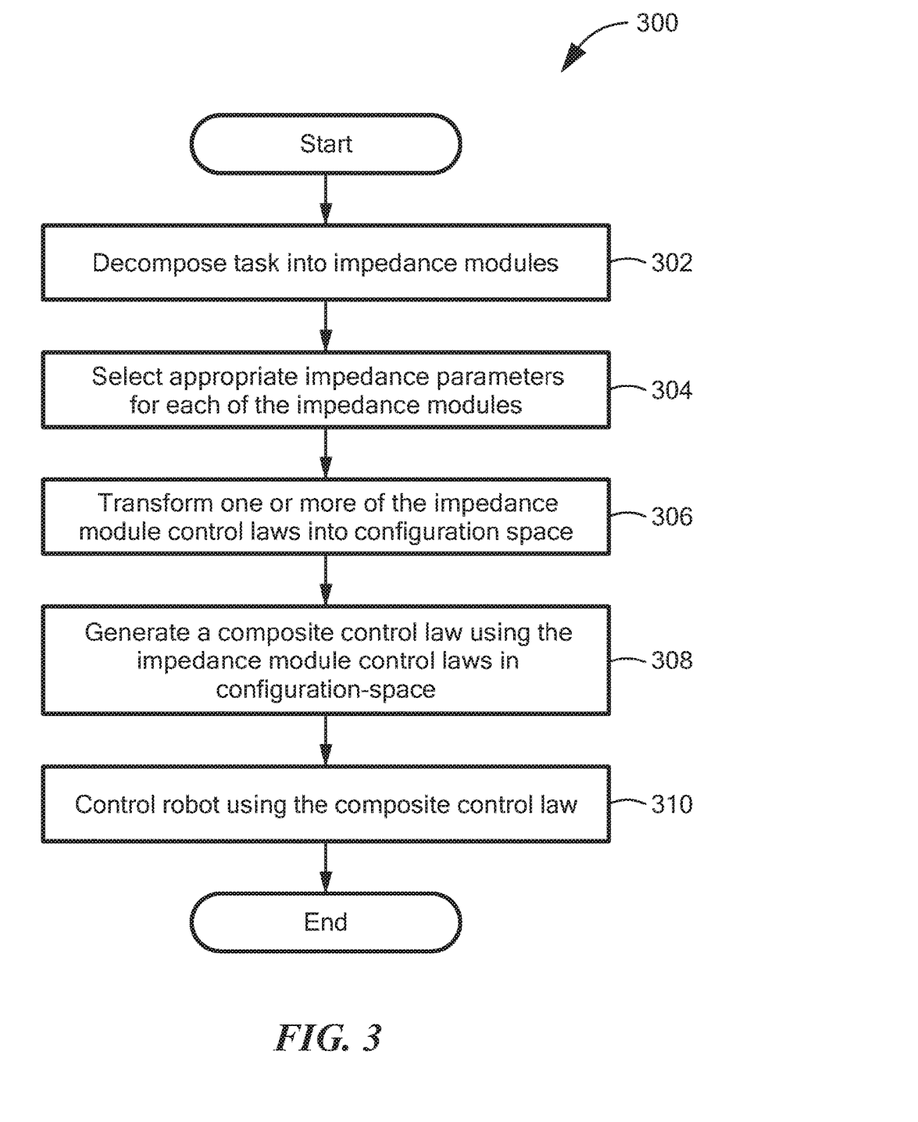
FIGS. 3 and 3A are flow diagrams illustrating processing that may occur within a robot control system, in accordance to some embodiments.
Figure 3A:
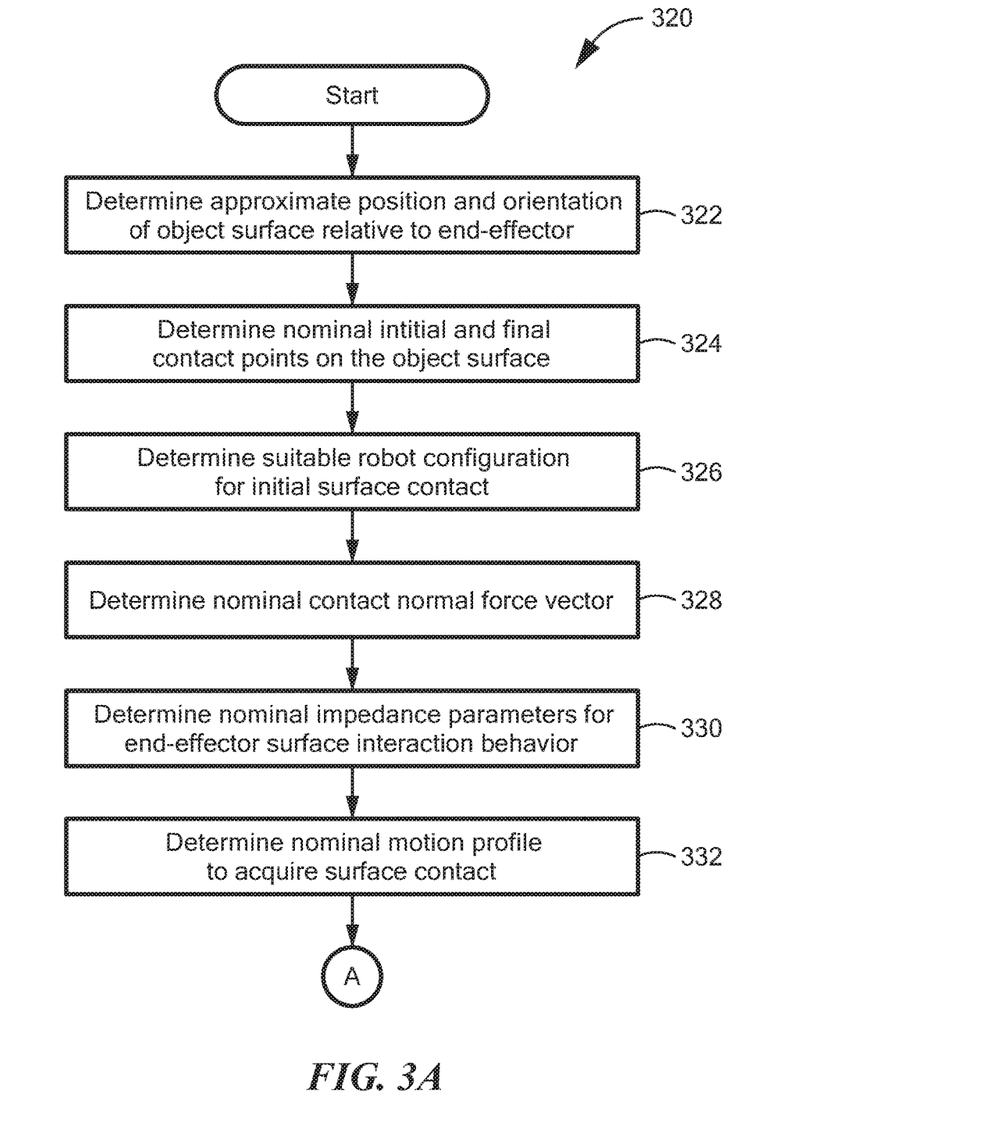

FIGS. 3 and 3A are flow diagrams showing illustrative processing that can be used to control a robot (e.g., robot 102 in FIG. 1 and/or robot 200 of FIG. 2). At least a portion of the processing described herein may be implemented within an impedance controller (e.g., controller 108 in FIG. 1, controller 124 of FIG. 1A, and/or controller 144 of FIG. 1B).

Rectangular elements (typified by element 302 in FIG. 3), herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order. In some embodiments, the processing blocks represent states and transitions, respectively, within a finite-state machine, which can be implemented in software and/or hardware.

Referring to FIG. 3, a method 300 begins at block 302, where a task to be performed by a robot may be decomposed into multiple impedance-based impedance modules. Non-limiting examples of impedance modules include: (1) using an end-effector to manipulate an object (e.g., to grasp or push an object); (2) using a robot's elbow to manipulate an object (e.g., to pin an object between the robot's arm and trunk); (3) releasing an object grasped/pinned by the robot; and (4) imposing a "base" or "reference" joint stiffness for the robot.

At block 304, impedance parameters are selected for each of the impedance modules. For example, if a given impedance module uses a damped spring control law to manipulate an object using an end-effector, a resting position, a stiffness, and a damping coefficient may be selected. As another example, impedance parameters may be selected to achieve a joint configuration that will reduce (and ideally minimize) apparent end-effector mass normal to an object's surface. In some embodiments, techniques described below in conjunction with FIG. 3A may be used to select impedance parameters. An impedance module and its selected impedance parameters define an impedance control law for the robot.

At block 306, one or more of the impedance modules control laws may be transformed into configuration space. For example, a Cartesian-space control law for an end-effector may be transformed into configuration space using a Jacobian matrix associated with the end-effector. It should be understood that one or more of the impedance modules may be defined in terms of configuration-space control laws and, thus, such control laws do not need to be transformed.

At block 308, a composite control law for the robot is generated using the configuration-space impedance module control laws. As described above in conjunction with FIG. 1, the composite control law may be generated by summing the control laws of each of the individual impedance modules.

At block 310, the composite control law is used to control the robot using, for example, a force-based or a position-based impedance controller, as described above in conjunction with FIGS. 1, 1A, and 1B. Any suitable criteria can be used to determine when controller execution should end. For example, execution may end when certain external conditions are detected or when a given number of processing cycles has been exceeded.

Referring to FIG. 3A, a method 320 shows an example performing a task using compositional impedance programming. In this example, the task is make contact with a single-armed robot's end-effector normal to an object. The robot is assumed to start not in contact with the surface. It will be understood that the concepts and techniques described herein can be applied to many different types of tasks, including but not limited to (1) sanding a rough surface smooth; (2) rotating a crank; and (3) tracing a poorly-known contour.

At block 322, an approximate position and orientation of the object surface, relative to the end-effector, is determined. This information can be acquired using known techniques including, but not limited to, LIDAR (light detection and ranging), camera-based computer vision (e.g. automated scene analysis), or other techniques used extensively in autonomous vehicle guidance.

At block 324, nominal initial and final contact points on the surface are determined. This information can be determined using, for example, a computer-aided drawing (CAD) of the object surface.

At block 326, a suitable robot configuration is determined for initial surface contact. In some embodiments, the configuration is selected to reduce (and ideally minimize) apparent end-effector mass normal to the (nominal) surface.

At block 328, a nominal (desired) contact normal force vector is determined. In some embodiments, this vector may be determined using a database of surface material removal properties.

At block 330, nominal impedance parameters (e.g. $k_{ef}(t)$, $b_{ef}(t)$) are determined for a first impedance module defining interaction between the end-effector and the surface. In some embodiments, the nominal impedance parameters may be determined using optimization methods to compromise between motion and force errors.

At block 332, a nominal motion profile to acquire surface contact is determined. In various embodiments, the nominal motion profile is based on a straight line end-effector motion to the initial contact point (i.e., the contact point determined at block 324) at constant velocity, so that the initial impact force determined by the end-effector's apparent mass is within a given tolerance.

At block 334, a velocity profile tangent to the surface (i.e., the nominal surface) is determined. In some embodiments, this is based on a reciprocating trapezoidal speed profile between (nominal) initial and final contact points at optimum speed for surface material removal.

At block 336, a desired zero-force trajectory $x_{ef0}(t)$ is calculated. In certain embodiments, zero-force position "penetrates" inside and normal to surface, added to nominal motion profile by an amount determined from nominal stiffness and nominal contact force.

At block 338, parameters for configuration-space impedance control are determined; i.e., $\theta_0(t)$, $K(t)$, and $B(t)$. In some embodiments, these parameters are selected as the minimum configuration-space stiffness and damping to regulate configuration within tolerance.

At block 340, the end-effector impedance control parameters $x_{ef0}(t)$, $K_{ef}(t)$, $b_{ef}(t)$ are transformed into configuration space.

At block 342, the end-effector impedance control law and the configuration-space impedance control law may be summed to generate a composite control law.

At block 344, an impedance controller can use the composite control law to simultaneously provide configuration-space and end-effector impedance control. Execution may terminate based on measured external conditions (e.g., acceptable surface smoothness in the case of sanding an object's surface).

Figure 4:
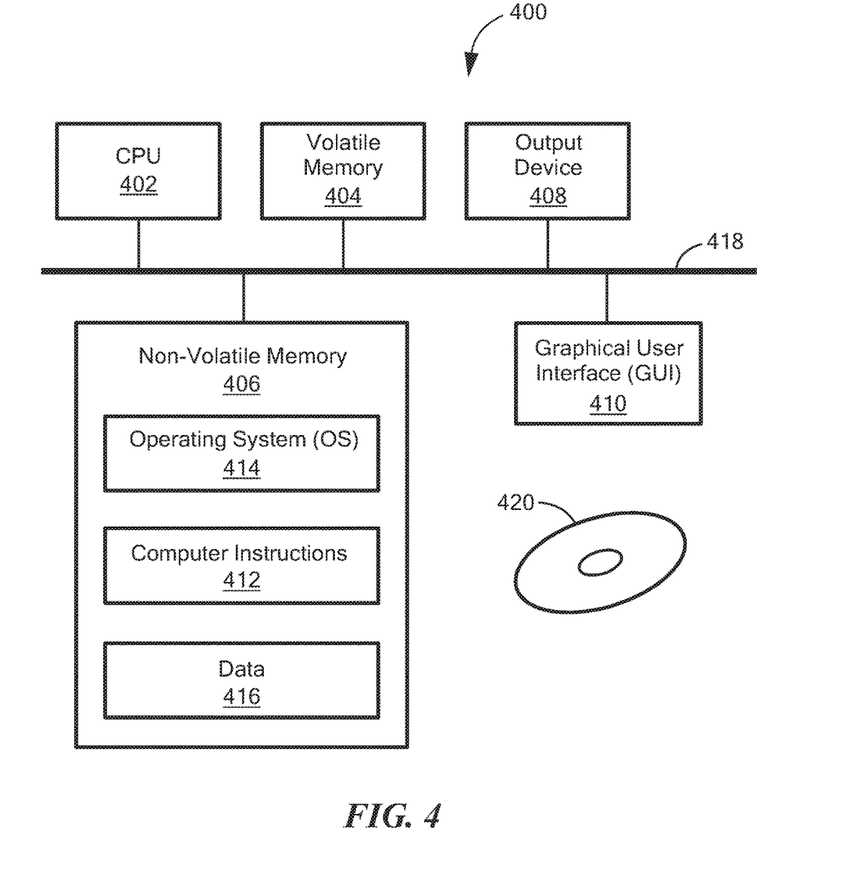
FIG. 4 is block diagram of a processing device on which the processing of FIGS. 3 and 3A may be implemented, according to certain embodiments of the disclosure.

FIG. 4 shows an illustrative processing device 400 that can perform at least part of the processing described herein (e.g., the processing shown and described with FIG. 4), according to some embodiments of the disclosure. The computer 400 may include a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 may be configured to store computer instructions 412, an operating system 414, and data 416. In one example, the computer instructions 412 are executed by the processor 402 out of volatile memory 404. In some embodiments, the computer 400 corresponds to a virtual machine (VM). In other embodiments, the computer 400 corresponds to a physical computer.

In some embodiments, a non-transitory computer readable medium 420 may be provided on which a computer program product may be tangibly embodied. The non-transitory computer-readable medium 420 may store program instructions that are executable to perform the processing of FIGS. 3 and/or 3A.

Referring again to FIG. 4, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette and so forth but does not include a transitory signal per se.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A robot control system comprising:
a plurality of impedance modules, each of the impedance modules defining one or more mechanical impedance parameters; and
an impedance controller implemented in a processor and configured to:
generate a composite robot control law based on at least some of the plurality of impedance modules;
receive an actual robot configuration and an actual robot configuration-space velocity;
generate an actuator torque using the composite robot control law, the actual configuration of a robot and the actual configuration-space velocity of the robot; and
control actuators of the robot according the actuator torque;
wherein:
a first one of the plurality of impedance modules defines an impedance control law for an end-effector of the robot;
a second one of the plurality of impedance modules drives the robot to a selected base configuration; and
a third one of the plurality of impedance modules defines an impedance control law for a joint of the robot.

2. The system of claim 1 wherein the third one of the impedance modules defines an impedance control law for an elbow of the robot.

3. The system of claim 1 wherein the impedance controller is further configured to transform the impedance control law for the end-effector from Cartesian-space to robot configuration-space.

4. The system of claim 1 wherein the impedance controller is configured to take into account external forces when generating the actuator torque.

5. The system of claim 1 wherein one or more of the plurality of impedance modules are energetically passive.

6. The system of claim 1 wherein a first one of the plurality of impedance modules defines a control law for a first robot and a second of the plurality of impedance modules defines a control law for a second robot different from the first robot.

7. The system of claim 1 wherein at least one of the plurality of impedance modules defines one or more impedance parameters for a damped spring.

8. A method for controlling a robot, the method comprising:
selecting impedance parameters for each of a plurality of impedance modules, wherein each of the plurality of impedance modules specifies a robot behavior associated with a task, wherein each of the impedance modules and its selected impedance parameters define an impedance control law and wherein a first one of the impedance modules defines an impedance control law for an end-effector of the robot; a second one of the impedance modules drives the robot to a selected base configuration; and a third one of the impedance modules defines an impedance control law for a joint of the robot;
transforming, via a processor, one or more of the impedance module control laws into configuration space;
generating, via a processor, a composite control law using the impedance module controls laws in configuration-space; and
controlling the robot, via a processor, using the composite control law.

9. The method of claim 8 wherein at least one of the plurality of impedance modules defines a damped spring control law to manipulate an object using an end-effector of the robot.

10. The method of claim 8 wherein at least one of the plurality of impedance modules defines a damped spring control law to manipulate an object using an elbow of the robot.

11. The method of claim 8 wherein at least one of the plurality of impedance modules imposes a base joint stiffness on the robot.

12. The method of claim 8 wherein selecting impedance parameters for each of a plurality of impedance modules includes selecting, for at least one of the plurality of impedance modules, a resting position, a stiffness, and a damping coefficient for a damped spring control law.

13. The method of claim 8 wherein selecting impedance parameters for each of a plurality of impedance modules includes selecting, for at least one of the plurality of impedance modules, a base joint stiffness for the robot.

14. The method of claim 13 wherein selecting the base joint stiffness for the robot includes selecting a base joint stiffness to reduce apparent end-effector mass normal to an object's surface.

* * * * *